US007564830B2

(12) United States Patent
Desai et al.

(10) Patent No.: US 7,564,830 B2
(45) Date of Patent: Jul. 21, 2009

(54) SYSTEM AND METHOD FOR TERMINATING A VOICE CALL IN ANY BURST WITHIN A MULTI-BURST SUPERFRAME

(75) Inventors: Sanjay G. Desai, Lake in the Hills, IL (US); John M. Gilbert, Hawthorn Woods, IL (US); Daniel J. McDonald, Cary, IL (US); Harish Natarahjan, Streamwood, IL (US); Robert J Novorita, Orland Park, IL (US); Alan L. Wilson, Long Grove, IL (US)

(73) Assignee: Motorola, Inc., Schaumburg, IL (US)

(*) Notice: Subject to any disclaimer, the term of this patent is extended or adjusted under 35 U.S.C. 154(b) by 281 days.

(21) Appl. No.: 11/467,182

(22) Filed: Aug. 25, 2006

(65) Prior Publication Data

US 2008/0049711 A1 Feb. 28, 2008

(51) Int. Cl.
*H04B 7/212* (2006.01)

(52) U.S. Cl. ...................................... 370/347; 370/509

(58) Field of Classification Search ................. 370/345, 370/337, 401, 442, 503, 509, 514, 347, 395.61, 370/493–495

See application file for complete search history.

(56) References Cited

U.S. PATENT DOCUMENTS

RE28,577 E * 10/1975 Schmidt ..................... 370/324
6,373,860 B1 * 4/2002 O'Toole et al. ............. 370/493
6,542,718 B1 * 4/2003 Kuo et al. ..................... 455/69
7,203,207 B2 * 4/2007 Hiben et al. ................ 370/514
2004/0240465 A1 * 12/2004 Newberg et al. ............ 370/442
2007/0230407 A1 * 10/2007 Petrie et al. ................. 370/337

* cited by examiner

*Primary Examiner*—CongVan Tran
(74) *Attorney, Agent, or Firm*—Terri S. Hughes

(57) ABSTRACT

A system and method for effectively and reliably terminating a voice call in any burst within a multi-burst superframe. A transmitting unit generates a termination burst upon detecting a dekey event. The termination burst includes a data synchronization pattern, a slot type field indicating an end of a call, and an information field surrounding the data synchronization pattern and the slot type field. The information field is encoded from a predetermined voice encoder frame unique to the termination burst. Once all buffered voice information is transmitted, the termination burst is transmitted prior to the end of the multi-burst superframe. A base station or other receiving unit monitors the incoming signal. Upon detecting the data synchronization pattern, the receiving unit decodes the slot type field and the information field. The receiving unit determines whether the decoded slot type field is indicative of the end of a call, and whether a specific portion of the decoded information field matches the predetermined voice encoder frame. If both are true, the receiving unit terminates the call.

24 Claims, 5 Drawing Sheets

SYSTEM AND METHOD FOR TERMINATING A VOICE CALL IN ANY BURST WITHIN A MULTI-BURST SUPERFRAME

TECHNICAL FIELD OF THE INVENTION

This invention relates generally to mobile radio communication systems, and more particularly to a system and method for terminating a voice call in any burst within a multi-burst superframe.

BACKGROUND OF THE INVENTION

Communication systems typically include a plurality of communication devices, such as mobile or portable radio units, dispatch consoles and base stations, which are geographically distributed among various base sites and console sites. The radio units wirelessly communicate with the base stations and each other using radio frequency (RF) communication resources, and are often logically divided into various subgroups or talk-groups. The base stations are hardwired to a controller that controls communications within the system.

In a time division multiple access (TDMA) system, for example, voice transmission channels are divided into periodically repeated superframes, each of which includes multiple digitized voice bursts. Typically, the first burst in each superframe includes a voice frame synchronization pattern surrounded by encoded voice information. The remaining bursts may include link control information in the center of the encoded voice information instead of the voice frame synchronization pattern.

In such TDMA systems, a typical method for ending a voice call is for the transmitting radio unit to send a standalone termination burst following the last burst of the superframe during which the end of call event is detected. The termination burst generally contains a data synchronization pattern that is a symbol complement to the voice frame synchronization pattern, thus minimizing the risk of mistakenly terminating a call.

This method of terminating a voice call, however, has several drawbacks. First, when a dekey event indicates the end of the voice call before the last burst in the superframe, the radio unit must nonetheless keep transmitting the remaining bursts with some predetermined information, as the termination burst can only be transmitted after the last burst in the superframe. As a result, the slot channel remains occupied (i.e., the call is still technically "active") until the end of the superframe even though the dekey event occurred earlier in the superframe, which prevents other units from using the slot channel during that time.

Additionally, with some call scenarios, such as on takeovers with a console call interrupting a voice call, audio from the interrupting source must be buffered until the current call has properly been terminated at the end of a superframe so that the interrupting audio can be sent over the air. These interruptions may happen multiple times during a single call. Each time this happens, a delay up to the duration of the superframe may be introduced with the baseline operation. This delay will remain present until the call ends.

Accordingly, there is a need for a system and method of terminating a voice call in any burst within a multi-burst superframe in a more efficient manner than the method described above.

BRIEF DESCRIPTION OF THE FIGURES

Various embodiments of the invention are now described, by way of example only, with reference to the accompanying figures.

Figure 1:
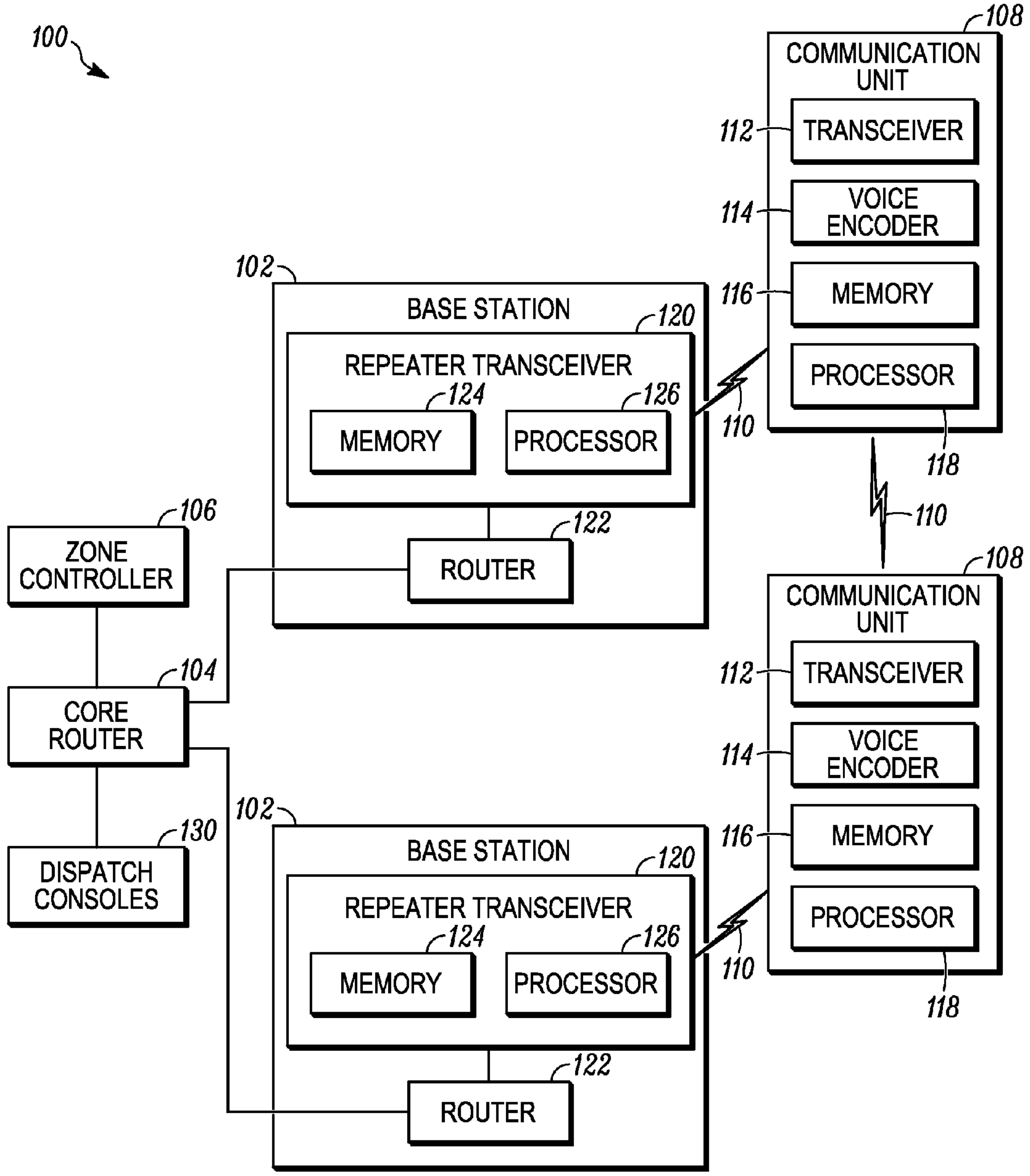
FIG. 1 shows one embodiment of a system for transmitting and receiving a termination burst according to the present invention.

Skilled artisans will appreciate that elements in the figures are illustrated for simplicity and clazrity and have not necessarily been drawn to scale. For example, the dimensions and/or relative positioning of some of the elements in the figures may be exaggerated relative to other elements to help improve the understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAIL DESCRIPTION OF THE INVENTION

The present invention is an apparatus and method for effectively and reliably terminating a voice call in any burst within a multi-burst superframe. The present invention involves a transmitting unit generating a termination burst upon detecting a dekey event, and is capable of transmitting the termination burst in any burst within the multi-burst superframe after all the buffered voice information has been transmitted and prior to the end of the multi-burst superframe. If, however, the last portion of the buffered voice information transmission requires the last burst of the superframe, the termination burst is transmitted at the beginning of the next superframe as in the prior art. The termination burst includes a data synchronization pattern, a slot type field indicating an end of a call, and an information field surrounding the data synchronization pattern and the slot type field. The information field is encoded from a predetermined voice encoder frame bit pattern engineered and/or reserved for the termination burst. A base station or other receiving unit monitors the incoming signal from the transmitting unit (e.g., the radio). Upon detecting the data synchronization pattern, the receiving unit decodes the slot type field and the information field. The receiving unit determines whether the decoded slot type field is indicative of the end of a call, and whether a specific portion of the decoded information field matches that of the predetermined voice encoder frame bit pattern. If both are true, the receiving unit terminates the call. Let us now discuss the present invention in greater detail by referring to the figures below. For clarity and exemplary purposes only, the following description and examples assume a TDMA system, however, other types of multi-user systems, e.g., dual frequency division multiple access (FDMA)/TDMA systems, may be used.

FIG. 1 shows one embodiment of a communication system in accordance with the present invention. The system 100 comprises a plurality of base stations 102 that are in communication with a core router 104. The core router 104 is coupled to a zone controller/server 106. The zone controller 106 manages and assigns Internet protocol (IP) multicast addresses for payload (voice, data, video, etc.) and control messages between and among the various base stations 102. Base stations 102 communicate wirelessly with various communication units 108 such as mobile or portable wireless radio units. Each communication unit 108 may also be capable of communicating directly with other communication units in the system. The system may also include dispatch consoles 130 coupled to the core router 104 either wirelessly or by wireline.

As shown in FIG. 1, communication units 108 include a transceiver 112 for transmitting and receiving wireless audio signals 110, a voice encoder 114 (such as an IMBE full-rate vocoder, an AMBE half rate vocoder, or any other type of voice encoder) for compressing and encoding a voice signal into a voice frame, and a memory 116 for storing the voice encoder frame. The communication units 108 also include a processor (such as a microprocessor, microcontroller, digital signal processor, or a combination of such devices) 118 for generating, encoding, and compiling voice or data information as bursts for outgoing audio signals as well as decoding and processing the bursts of incoming audio signals.

Each base station 102 is comprised of at least one repeater transceiver 120 that communicates wirelessly with the communication units 108. The repeater transceiver 120 is coupled, via Ethernet, to an associated router 122, which is in turn coupled to the core router 104. Each repeater transceiver 120 may also include a memory 124, and a processor 126 capable of decoding and processing the received signals.

For purposes of the following discussion, the term “transmitting unit” is used to mean any communication unit or dispatch console that is transmitting a wireless TDMA signal. The term “receiving unit” is used to mean any base station, communication unit or dispatch console that is receiving the transmitted wireless audio signal from the transmitting unit.

Figure 2:
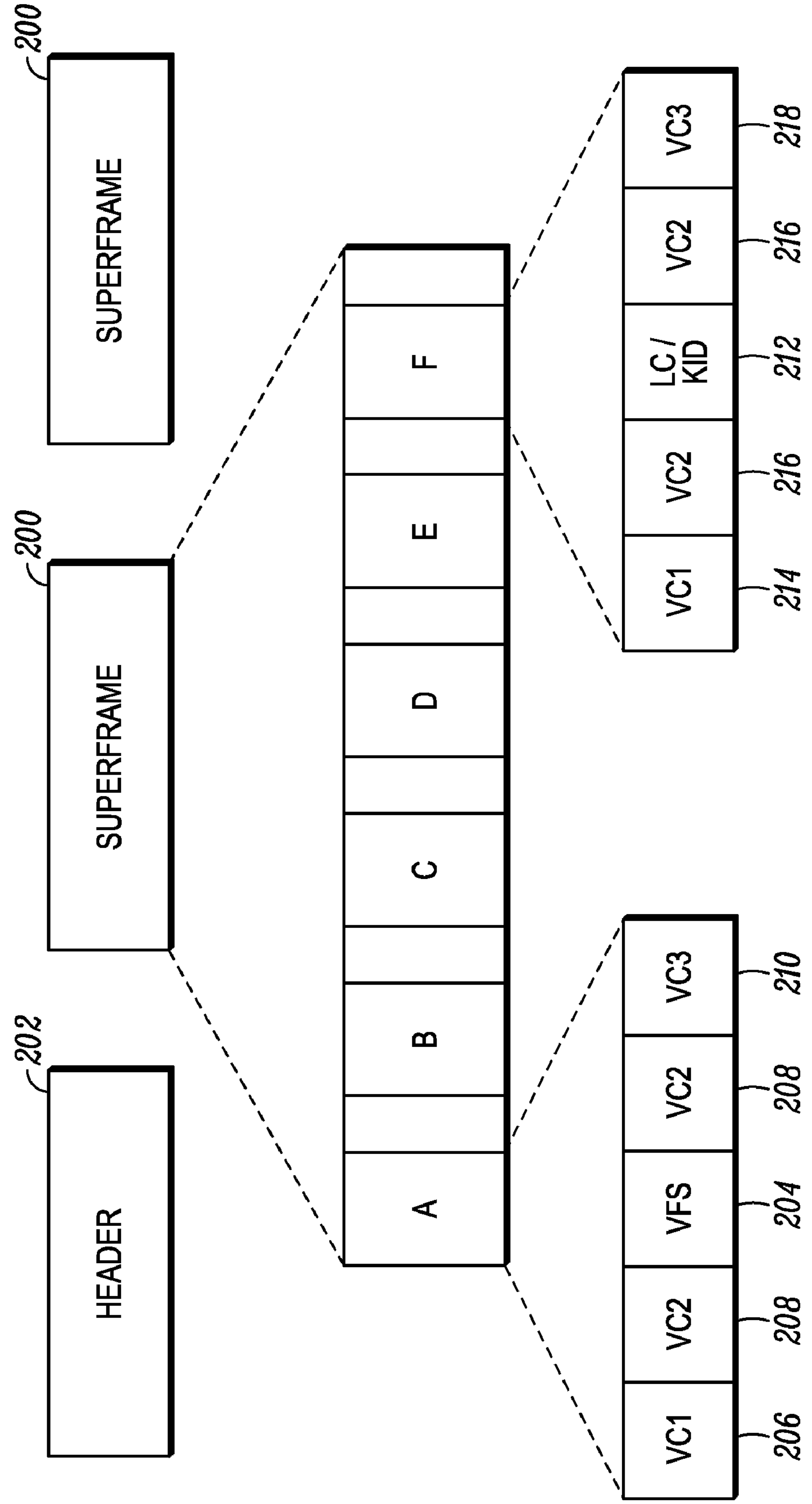
FIG. 2 shows one embodiment of a TDMA superframe according to the present invention.

FIG. 2 illustrates one embodiment of a communication protocol for transmitting voice call information in the system of FIG. 1. In this embodiment, the voice call signal is a TDMA voice call signal separated into multiple superframes 200. Each superframe 200 includes six individual bursts A, B, C, D, E, and F, each of which is 264 bits in length and approximately 27.5 ms in duration. While not shown, each superframe may also include a common announcement channel between transmitted bursts or guard bands on each side of received bursts. Every 360 ms during a voice call, this superframe burst sequence is repeated. It should be noted that the superframe burst sequence is not limited to 360 ms, but rather the superframe burst sequence may be any duration.

Each voice call may also begin with a header 202. The header 202 may include a link control header burst, which may contain information such as a manufacturer identifier, a talk-group identifier, a source identifier, and a destination identifier. The header 202 may also have an encryption synchronization header burst if the voice transmission is encrypted. The encryption synchronization header burst may include information such as a message indicator, an encryption algorithm identifier, an encryption key identifier, and a data synchronization pattern.

Each superframe 100 begins with burst A regardless if the voice transmission includes the link control header burst and/or the encryption synchronization header burst. As shown in FIG. 1, burst A may include a 48-bit voice frame synchronization pattern 204 in the center of the burst. The voice frame synchronization pattern 204 may be surrounded by a first voice frame (VC1) 206, a second voice frame (VC2) 208 and a third voice frame (VC3) 210, each of which may be 72 bits in length. As can be seen from FIG. 2, the second voice frame (VC2) 208 is split into two parts, one on either side of the voice frame synchronization pattern 204.

Bursts B through F may similarly include three independent information frames 214, 216, and 218. However, unlike burst A, bursts B through F do not include a voice frame synchronization pattern, but instead substitute either link control information or key identifier information 212 in the middle of the burst. When transmitting voice call information, each information frame in bursts A-F corresponds to 20 ms of voice information that is compressed and error protected into a 72-bit encoded voice code word.

Figure 3:
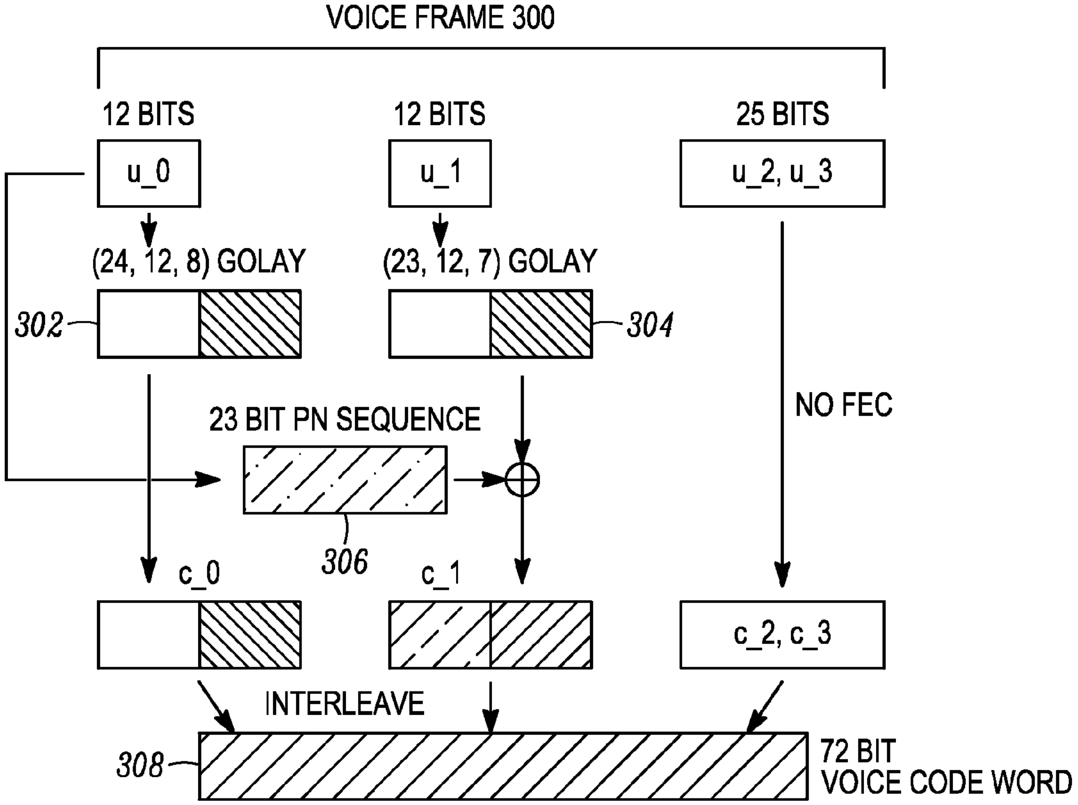
FIG. 3 shows one embodiment of a process for encoding a voice encoder frame into a code word according to the present invention.

One process for encoding the voice information into a 72-bit voice code word is illustrated in FIG. 3. First, a 20 ms voice signal is compressed and encoded into a 49-bit voice frame 300 by the voice encoder 114. As shown in FIG. 3, the 49-bit voice encoder frame 300 produced by the voice encoder 114 may comprise four information vectors: u0, u1, u2, and u3. In one exemplary embodiment using the Motorola ASTRO 6.25e (F2) system, information vector u0 contains the twelve most significant bits, information vector u1 contains the next twelve most significant bits, and u2 and u3 contain the 25 least significant bits. More particularly, bits 0-3 and 37-39 represent the pitch setting, bits 4-7 and 35 represent the voicing setting, bits 8-11 and 36 represent the gain setting, and the remaining bits represent quantified spectral information for the voice signal.

The 49-bit voice encoder frame 300 is further encoded by the processor 118 using forward error correction. In one embodiment, the twelve most significant bits contained in vector u0 are encoded with a (24,12,8) Golay code 302, resulting in a code word c0. The next twelve most significant bits contained in vector u1 are encoded with a (23,12,7) Golay code 304. The result of the Golay encoding of u1 is exclusive-ored with a 23-bit pseudorandom noise sequence (PN sequence) 306 generated from the 12 bits of u0. The result of the exclusive-or sum is defined as c1. Unlike vectors u0 and u1, vectors u2 and u3, which contain the least significant bits, are not encoded. Thus, code words c2 and c3 in FIG. 2 simply represent the 25-bits of vectors u2 and u3. Finally, the four code words, c0, c1, c2, and c3, are interleaved to form a 72-bit voice code word 308.

Of course, while one specific embodiment of a voice signal, an associated superframe structure, and an encoding process is described, those skilled in the art will readily understand that other structures may be used for the voice signal and the superframe, and other processes may be used for performing the forward error correction.

Figure 4:
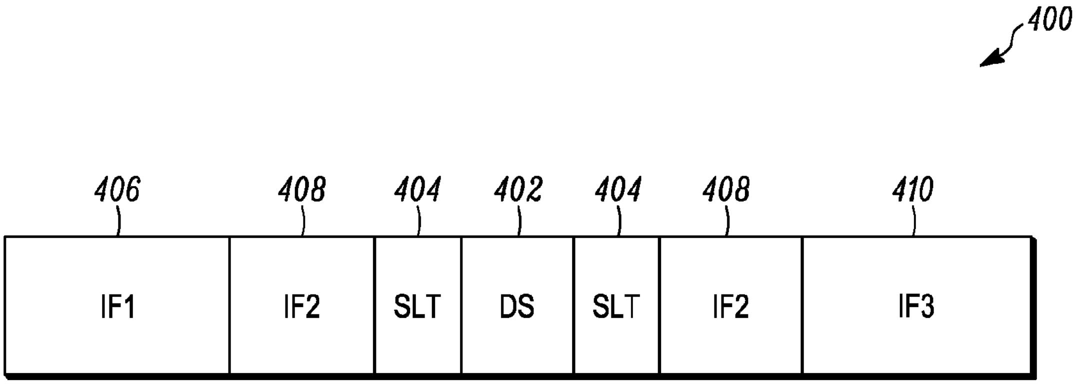
FIG. 4 shows one embodiment of a termination burst according to the present invention.

According to the present invention, a termination burst is configured to comply with protocols of a typical superframe burst such that the termination burst is transmitted in any burst within a multi-burst superframe. Thus, as shown in FIG. 4, the termination burst 400 may include a data synchronization pattern 402, a slot type field 404, a first information frame (IF1) 406, a second information frame (IF2) 408, and a third information frame (IF3) 410. The data synchronization pattern 402 is configured to signal a receiving unit that a burst including the data synchronization pattern 402 contains information or data other than voice information. The slot type field 404 defines the type of information that is contained in the three information frames 406, 408, and 410. The information contained in the slot type field 404 may also be encoded using a (20,8) Golay code.

In one embodiment, the data synchronization pattern 402 and the slot type field 404 in the termination burst may be configured similar to typical stand-alone burst or data/control burst. For example, in the Motorola ASTRO 6.25e (F2) system, the data synchronization pattern may be 48 bits in length and a symbol complement to a voice frame synchronization pattern generally included in burst A. The slot type field 404 may be 20 bits in length total, with 10 bits positioned on each side of the data synchronization pattern.

IF1 406, IF2 408, and IF3 410 of the termination burst 400 may include predetermined code words for a termination burst. In one embodiment, a first predetermined code word for both IF1 406 and IF3 410 may have a unique bit pattern reserved solely for a termination burst while a second predetermined code word for IF2 408 may have a bit pattern corresponding to a silent voice signal. The unique code word chosen for IF1 406 and IF3 410 is used by a receiving unit to detect the presence of the termination burst, as described in more detail below.

Constructing the unique code word for IF1 406 and IF3 410 in the termination burst may be performed in the following manner. First, a unique voice encoder frame is determined based on the bit definitions for the voice frame generated by the voice encoder 114. In particular, the unique voice encoder frame is chosen to have a bit pattern that would not otherwise be used by the voice encoder 114 when synthesizing a voice signal. For example, in the Motorola ASTRO 6.25e (F2) system, setting each of the bits corresponding to the pitch setting in a voice encoder frame to the same value results in an invalid frame that would not be generated by the voice encoder when synthesizing a voice signal or otherwise used by the system. Accordingly, a unique 49-bit voice code frame may be formed by setting all of the bits 0-3 and 37-39 to either 0 or 1.

Additionally, the bits representing the voicing setting and the gain setting may be set to 0. This allows the termination burst 400 to have minimal audible effect and not create undesirable noise in the event the termination burst is not properly detected (as discussed below) but is instead treated like a normal voice burst. The remaining bits (those representing the quantized spectral information of the voice signal) have no significant effect on the termination burst 400 and can therefore be chosen as desired.

Accordingly, one exemplary unique 49-bit voice code frame according to the present invention may be defined as follows:

u0: 111100000000
u1: 010010110100
u2: 10110100101
u3: 00111010010110

Unlike IF1 406 and IF3 410, IF2 408 is not used by a receiving unit for detecting the termination burst 400. Accordingly, it may be desirable to choose a voice encoder frame pattern for IF2 408 that minimizes any undesirable audio effects. Thus, in one embodiment, the 49-bit voice encoder frame used to generate IF2 408 may be chosen to correspond to a silent voice signal, i.e., a 49-bit voice encoder frame pattern representative of silence. In one embodiment, this 49-bit silence pattern may be:

u0: 111110000000
u1: 000110101001
u2: 10011111100
u3: 01100111000001

Each of the bit patterns for the unique voice encoder frame and the voice encoder silence frame may be stored in the memory of the transmitting unit such that they may be retrieved whenever a termination burst is generated. The unique voice encoder frame may also be stored in the memory of the receiving unit so that a received burst may be compared with the stored pattern to determine whether the received burst is a termination burst.

The unique voice encoder frame and the voice encoder silence frame described above are encoded using the same encoding process described with regards to a typical 49-bit voice encoder frame in FIG. 3. Thus, the unique voice encoder frame is encoded to form a 72-bit code word that is unique for the termination burst, and the voice encoder silence pattern is encoded to form a 72-bit code representative of a silent voice signal. The unique 72-bit code word formed from the unique 49-bit pattern is used for information frames IF1 406 and IF3 410 and the 72-bit code word formed from the 49-bit silence pattern is used for information frame IF2 408.

Although one specific 49-bit pattern is shown for generating IF1 406 and IF3 410 in the termination burst 400, it is understood that many other patterns may also be used so long as those patterns are unique and would never be created by the voice encoder 114 when synthesizing a voice signal. Additionally, the 49-bit pattern used to generate IF1 406 may be different from that used for IF3 410. Similarly, patterns other than the one silence pattern described for forming IF2 408 may also be used so long as they are indicative of a silent voice signal. Alternatively, if IF2 408 is intended to be used by a receiving unit for identifying a termination burst, a unique pattern similar to that described for IF1 406 and IF3 410 may also be used for IF2 408.

Once the data synchronization pattern 402, slot type field 404, IF1 406, IF2 408, and IF3 410 are generated, the termination burst is compiled by processor 118. As shown in FIG. 4, this is done by positioning the data synchronization pattern 402 in the center of the burst, positioning one half of the slot type field 404 on each side of the data synchronization pattern 402, and surrounding the data synchronization pattern 402 and slot type field 404 with the three information frames IF1 406, IF2 408, and IF3 410. Similar to a typical voice burst shown in FIG. 2, the second information frame, IF2 408, is split into two parts, with each part positioned on either side of the data synchronization pattern 402. Unlike a typical voice burst, however, the entirety of the generated IF2 408 is not transmitted with the termination burst. As an entire burst in the above embodiment comprises 264 bits, and the data synchronization pattern and the slot type field consumes 68 of those bits, there are only 196 bits available for the three information fields. To account for this, only 52 bits of IF2 408 may actually be transmitted with the termination burst while all 72 bits of IF1 and IF3 are transmitted. In one embodiment, this is accomplished by replacing the 20 middle bits of IF2 with the slot type field. However, it is understood that a different portion other than the middle 20 bits of IF2 may also be removed. Alternatively, a portion of IF1 or IF3 may also be removed from the termination burst instead of IF2.

Figure 5:
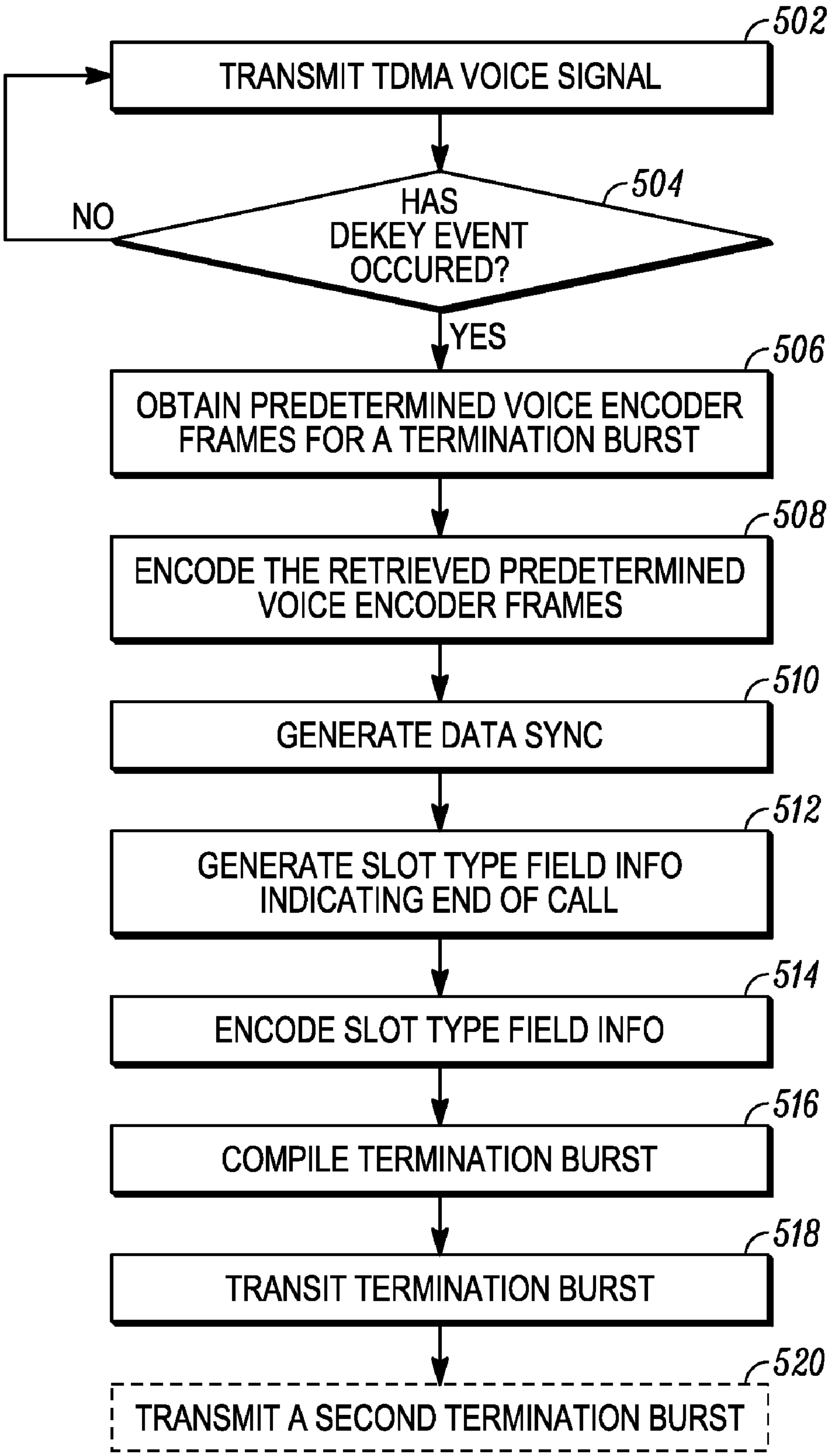
FIG. 5 is a flow chart illustrating one embodiment of a method for generating the termination burst of FIG. 4 according to the present invention.

FIG. 5 shows one embodiment of a method for generating a termination burst 400 according to the present invention.

First, in step 502, the transceiver 112 of the transmitting unit begins transmitting a TDMA voice signal to a receiving unit. The process for initiating a TDMA voice call is well known in the art and is therefore not discussed in detail herein. In step 504, the transmitting unit checks to determine whether a dekey signal has occurred. A dekey signal occurs when a user indicates that he is finished speaking, for example, by releasing a push-to-talk button on a handheld or vehicular unit. If no dekey event has occurred, the process returns to step 502 and the transmitting unit continues to transmit voice information as normal.

If a dekey event has occurred, the process continues to step 506. In step 506, the predetermined 49-bit voice encoder frames for a termination burst are obtained. This can be done by either generating the bits for the predetermined voice encoder frame based on stored information or retrieving the predetermined voice encoder frame directly from the memory of the transmitting unit. In step 508, the 49-bit voice encoder frames are encoded to form the 72-bit code words for IF1, IF2, and IF3 using the process shown in FIG. 3. In step 510, a data synchronization pattern having 48 bits is generated. In step 512, slot type field information indicating an end of call is generated, and in step 514, the slot type field information is encoded. In step 516, the termination burst is compiled using the 72-bit code words formed in step 508, the data synchronization pattern, and the encoded slot type field. As discussed above, this is done by positioning the data synchronization pattern in the middle with the slot type field split on either side of the data synchronization pattern. Twenty bits are removed from IF2. IF1, IF3, and the remainder of IF2 are positioned surrounding the slot type field. In this example, the termination burst is transmitted by the transceiver 112 during the next available burst time slot immediately after all buffered voice is transmitted in appropriate bursts. It is important to note, however, that the termination burst may be transmitted at any time after all the buffered voice is transmitted prior to the end of the multi-burst superframe. For example, if the last buffered voice information is transmitted in burst F of the current superframe, then the termination burst is transmitted in the burst following burst F in place where burst A of the next superframe would have occurred. In step 520, a second, optional termination burst may also be transmitted following the first termination burst. The second termination burst provides additional reliability to the system as discussed in more detail below.

Figure 6:
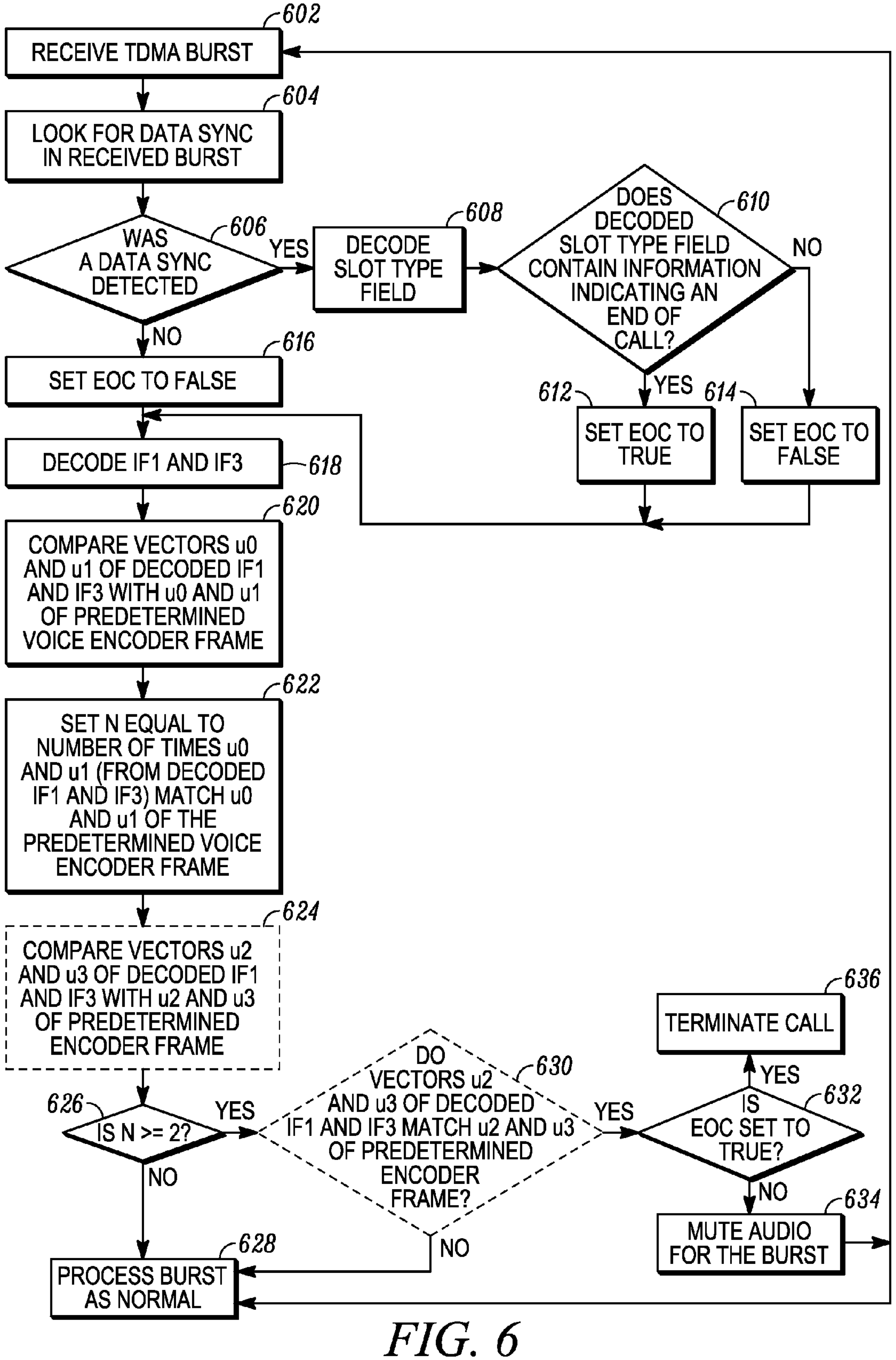
FIG. 6 is a flow chart illustrating one embodiment of a method for receiving the termination burst of FIG. 4 according to the present invention.

FIG. 6 illustrates one embodiment of a method for detecting a termination burst according to the present invention. In step 602, the receiving unit receives a TDMA burst from the transmitting unit. In step 604, the processor associated with the receiving unit looks for a data synchronization pattern within the received TDMA burst. In step 606, if no data synchronization pattern is detected, an end of call (EOC) term is set to FALSE (step 616) and the process proceeds to step 618.

However, if a data synchronization pattern is detected in step 606, the process proceeds to step 608. In step 608, the slot type field is decoded. In step 610, the processor associated with the receiving unit determines whether the decoded information in the slot type field indicates an EOC. In one embodiment, this is performed by determining whether the decoded slot type field information includes a specific pre-defined 4-bit field representative of an EOC signal. If the slot type field does indicate an EOC, the EOC term is set to the TRUE (step 612). If the slot type field does not indicate an EOC, the EOC term is set to FALSE (step 614). In either instance, the process proceeds to step 618.

In step 618, IF1 and IF3 are decoded to obtain a voice frame. In step 620, vectors u0 and u1 obtained from both decoded IF1 and decoded IF3 are compared to determine if they match with vectors u0 and u1 of the unique predetermined voice encoder frame pattern previously established and stored in the memory of the receiving unit. In particular, a first comparison is made between u0 of the voice frame decoded from IF1 of the received burst and u0 of the stored pattern; a second comparison is made between u1 of the voice frame decoded from IF1 of the received burst and u1 of the stored pattern; a third comparison is made between u0 of the voice frame decoded from IF3 of the received burst and u0 of the stored pattern; and a fourth comparison is made between u1 of the voice frame decoded from IF3 of the received burst and u1 of the stored pattern. In step 622, a value N is set to the number of times the decoded vectors u0 and u1, from IF1 and IF3, match the predetermined bit pattern.

If even further reliability is required in detecting whether a received burst is a termination burst, optional steps 624 may be performed. In optional step 624, vectors u2 and u3 of the voice frames obtained from decoded IF1 and IF3 are compared with vectors u2 and u3 of the unique predetermined voice encoder pattern stored in the memory to determine if there is a match. In one embodiment, a match is found if at least 18 of the 25 bits in vectors u2 and u3 of each information field are identical to those in vectors u2 and u3 of the stored predetermined bit pattern.

In step 626, the processor determines whether the value N is greater than or equal to 2. If N is not greater than or equal to 2, the receiving unit processes the received burst as a normal voice burst (i.e., by also decoding IF2 and processing IF1, IF2 and IF3 as in a normal burst) in step 628, and the process returns to step 602. If N is greater than or equal to 2, the process proceeds to either step 630 (if step 624 was performed) or step 632 (if step 624 was not performed). If step 624 was performed, step 630 determines whether 18 of the 25 bits in vectors u2 and u3 of both IF1 and IF3 match those in the stored predetermined bit pattern. If they match, the process continues to step 632. If they do not match, the receiving unit processes the received burst as a normal voice burst (step 628), and the process returns to step 602. Of course, it is understood that the specific criteria may be changed depending on the reliability requirements of the system. For example, the process may require that N is set to a number greater than 2 or less than 2. The process may also alternatively require a different number of matching bits in vectors u2 and u3, or that only one of the IF1 or IF3 have matching u2 and u3 vectors.

In step 632, the EOC term is checked to determine whether it is set to TRUE or FALSE. If the EOC term is set to FALSE, the process proceeds to step 634. In step 634, the audio is muted for the duration of the burst, and the process returns to step 602. If, however, the EOC term is set to TRUE, the call is terminated at step 636.

By means of the present invention, upon detection of a dekey event at a transmitting unit, a termination burst may be effectively transmitted in any burst within a multi-burst superframe after all of the buffered voice information has been transmitted in order to signal a receiving unit to terminate the call. In addition, as discussed below, some example simulations and calculations were performed to illustrate that the above-described system is also reliable, and that falsing and detection performance was acceptable for a multi-user system (e.g., a TDMA system).

First, the performance of the system was simulated to determine the probability of successfully detecting a single transmitted termination burst according to the present invention. The simulations were performed under various channel conditions, specifically with the receiving unit and transmitting unit static with respect to one another, and with the receiving unit and transmitting unit traveling 5 MPH and 60 MPH with respect to one another. The simulations were also performed assuming both a 2.6% bit error rate and a 5% bit error rate. The resulting data was as follows:

Probability of Detecting a Single Termination Burst

| Channel Type | Reliability @ 2.5% BER | Reliability @ 5% BER |
|---|---|---|
| Static | 99% | 94% |
| 5 MPH | 94% | 84% |
| 60 MPH | 96% | 83% |

However, if a second termination burst is sent following the first termination burst, the probability of detecting the termination burst is even further increased as illustrated below:

Probability of Detecting a Termination Burst Transmitted Twice

| Channel Type | Reliability @ 2.5% BER | Reliability @ 5% BER |
|---|---|---|
| Static | 99.85% | 99.9% |
| 5 MPH | 99.6% | 98% |
| 60 MPH | 99% | 97.5% |

In one embodiment described above, the actual decision of whether to mute or terminate a call is also qualified by verifying that at least 2 out of the 4 encoded vectors (u0 and u1 from IF1 and u0 an u1 from IF3) match the vectors u0 and u1 of the predetermined unique 49-bit pattern defined above. Accordingly, these criteria were used to calculate the probabilities of falsely muting or terminating a call.

The following calculations were performed based on the following assumptions: 1) two subscribers are continuously transmitting in both slots of a two-slot TDMA system respectively for 24 hours a day, and 2) both of the calls are secured or encrypted calls.

The probability of falsely muting a signal is the probability that the bits in at least 2 of the 4 encoded vectors (u0 and u1 from IF1 and u0 an u1 from IF3) match the unique predetermined voice encoder frame pattern after the vectors have been decoded by the receiving unit. For this to occur, at least 24 bits (i.e., 12 bits of one vector u0 or u1 and 12 bits of another vector u0 or 1 of IF1 or IF3) need to match. Assuming that 0s and 1s for each bit are equally probable, that there are four vectors from IF1 and IF3 (u0 and u1 from each) and that at least two or more of the four vectors must match, the probability can be computed as follows:

$$p\_enc=4C_2*(0.5)^{24}+4C_3*(0.5)^{24}+4C_4*(0.5)^{24}=3.5769*10^{-7}$$

If the time for one slot is 30 ms, the average time before the occurrence of a false mute is calculated as follows:

$$T(\text{false\_mute})=(1.0/p\_enc)*30*10^{-3}=23 \text{ hours}$$

Additionally, if the bits in vectors u2 and u3 are also verified against the unique predetermined pattern, the time before the occurrence is even further increased. Assuming, as discussed in one embodiment above, that at least 18 of the 25 bits in vectors u2 and u3 of both IF1 and IF3 must match the unique predetermined bit pattern, the probability of this happening for one of the IF1 and IF3 is:

$$\text{p\_u2u3}=(0.5)^{25}\sum_{N=18}^{25} 25\,C_N=0.0216$$

The probability of matching 18 of the 25 bits in u2 and u3 of both IF1 and IF3 is:

$$p\_u2u3^2=4.6840*10^{-4}$$

Accordingly, the probability of false muting using both the 2 out of 4 test for vectors u0 and u1 and the 18 out of 25 matching test for vectors u2 and u3 is:

$$p\_\text{false\_mute}=p\_u2u3^2*p\_enc=1.6754*10^{-10}$$

As a result, when using both these tests, the average time before a false mute is:

$$T(\text{false\_mute})=(1.0/p\text{-false\_mute})*30*10^{-3}=4.9*10^4 \text{ hours}$$

The probability of falsely terminating a call was calculated by multiplying p_false_mute times the probability that a false data synchronization pattern is detected times the probability that the slot type field matches a slot type field for a voice term burst term. The probability of a false data synchronization pattern detection is calculated as:

$$\text{p\_sync}=(0.5)^{48}\sum_{N=0}^{k} 48\,C_N$$

where k is the maximum number of bits allowed in error for the data synchronization pattern. Assuming that the information in a slot type field after decoding is comprised of 4 bits, the probability of the slot type field looking like that of a voice burst term is 1 in 16. Accordingly the probability of a false termination is:

$$p\_\text{term}=p\_\text{false\_mute}*p\_\text{sync}*p\_\text{slot\_type}=7.9696*10^{-17}$$

Therefore, assuming again that each burst in the superframe is 30 ms in duration, the average time before false termination is:

$$T(\text{false\_term})=(1.0/p\_\text{term})*30*10^{-3}=3.764*10^{14} \text{ hours}$$

Further advantages and modifications of the above described system and method will readily occur to those skilled in the art. The invention, in its broader aspects, is therefore not limited to the specific details, representative system and methods, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method for terminating a voice call in any burst within a multi-burst superframe comprising:

detecting a dekey event;

upon detecting the dekey event, generating a termination burst having a data synchronization pattern, a slot type field, and a first information frame, wherein at least a portion of the first information frame includes an encoded code word having a bit pattern unique to the termination burst; and transmitting the termination burst prior to an end of the multi-burst superframe.

2. The method of claim 1 wherein generating the termination burst includes obtaining a voice encoder frame having the bit pattern unique to the termination burst and encoding at least a portion of the voice encoder frame to create the encoded code word.

3. The method of claim 2 wherein obtaining the voice encoder frame includes obtaining a voice encoder frame that cannot be generated by encoding a voice signal with a voice encoder.

4. The method of claim 2 wherein bits in the bit pattern representing a pitch setting in the voice encoder frame are all set to the same value.

5. The method of claim 2 wherein bits in the bit pattern representing a voicing setting in the voice encoder frame are set to zero.

6. The method of claim 2 wherein bits in the bit pattern representing a gain setting in the voice encoder frame are set to zero.

7. The method of claim 1 wherein the termination burst further includes a second information frame including the encoded code word.

8. The method of claim 1 wherein the slot type field includes information indicating that the termination burst is an end of call signal.

9. The method of claim 1 further comprising, after transmitting the termination burst, transmitting a second termination burst.

10. The method of claim 1 wherein transmitting the termination burst includes transmitting the termination burst immediately following a transmission of all buffered voice information for the voice call.

11. A method for terminating a voice call in any burst within a multi-burst superframe comprising receiving a burst;

determining whether the burst includes a data synchronization pattern;

decoding a slot type field in the burst to obtain decoded slot type field information;

determining whether the decoded slot type field information indicates an end of a voice call;

decoding a first information frame in the burst to obtain a first decoded voice frame;

performing a first comparison between a first portion of the first decoded voice frame and a first portion of a predetermined voice encoder frame; and terminating the voice call if the decoded slot type field information indicates the end of the voice call and the first portion of the first decoded voice frame matches the first portion of the predetermined voice encoder frame.

12. The method of claim 11 further comprising processing the burst as a normal voice burst if the first portion of the first decoded voice frame does not match the first portion of the predetermined voice encoder frame.

13. The method of claim 12 further comprising muting audio for a duration of the burst if the first portion of the first decoded voice frame matches the first portion of the predetermined voice encoder frame and the decoded slot type field information does not indicate the end of the voice call.

14. The method of claim 11 further comprising:

performing a second comparison between a second portion of the first decoded voice frame and a second portion of the predetermined voice encoder frame;

decoding a second information frame in the burst;

performing a third comparison between a first portion of the second decoded voice frame and the first portion of the predetermined voice encoder frame;

performing a fourth comparison between a second portion of the second decoded voice frame and the second portion of the predetermined voice encoder frame;

determining a number of comparisons that resulted in a match from the first, second, third and fourth comparisons; and terminating the voice call if the decoded slot type field information indicates the end of the voice call and the number of comparisons that resulted in the match is at least two.

15. The method of claim 14 further comprising:

performing a fifth comparison between a third portion of the first decoded voice frame and a third portion of the predetermined voice encoder frame;

performing a sixth comparison between a third portion of the second decoded voice frame and the third portion of the predetermined voice encoder frame; and terminating the voice call if the decoded slot type field information indicates the end of the voice call, wherein the number of comparisons that resulted in a match from the first, second, third and fourth comparisons is at least two, and wherein both the fifth and sixth comparisons resulted in a match.

16. The method of claim 15 wherein the each of the first and second decoded voice frames are 49 bits in length, and wherein the first portion of both the first and second decoded voice frames comprises bits 0 through 11, the second portion of both the first and second decoded voice frames comprises bits 12 through 23, and the third portion of both the first and second decoded voice frames comprises bits 35 through 48.

17. The method of claim 15 wherein the third portion of the first and second decoded voice frames are 25 bits in length, and each of the fifth and sixth comparisons are considered a match if at least 18 out of 25 bits match the predetermined voice encoder frame.

18. A device capable of transmitting a termination burst in any burst within a multi-burst superframe comprising:

a voice encoder for generating encoding a voice signal;

a processor to generate a termination burst having a data synchronization pattern, a slot type field, and a first information frame, wherein the first information frame includes an encoded code word having a bit pattern unique to the termination burst; and a transceiver to transmit the termination burst, wherein the termination burst is transmitted prior to an end of the multi-burst superframe.

19. The device of claim 18 wherein the processor is further configured to form the encoded code word by encoding a predetermined voice encoder frame having a bit pattern reserved for the termination burst.

20. The device of claim 19 further comprising a memory to store the predetermined voice encoder frame.

21. A device capable of receiving a termination burst in any burst within a multi-burst superframe comprising:

a repeater transceiver to receive a voice call containing a burst;

a memory to store a predetermined voice encoder frame having a bit pattern unique to the termination burst; and a processor configured to determine whether the burst includes a data synchronization pattern, decode a slot type field in the burst to obtain decoded slot type field information, determine whether the decoded slot type field information indicates an end of a voice call, decode a first information frame in the burst to obtain a first decoded voice frame, perform a first comparison between a first portion of the first decoded voice frame and a first portion of a predetermined voice encoder frame, and terminate the voice call if the decoded slot type field indicates the end of the voice call and the first portion of the first decoded voice frame matches the first portion of the predetermined voice encoder frame.

22. The device of claim 21 wherein the processor is further configured to mute audio for a duration of the burst if the first portion of the decoded voice frame matches the first portion of the predetermined voice encoder frame and the decoded slot type field does not indicate the end of the voice call.

23. The device of claim 22 wherein the processor is further configured to perform a second comparison between a second portion of the first decoded voice frame and a second portion of the predetermined voice encoder frame, decode a second information frame in the burst, perform a third comparison between a first portion of the second decoded voice frame and the first portion of the predetermined voice encoder frame, perform a fourth comparison between a second portion of the second decoded voice frame and the second portion of the predetermined voice encoder frame, determine a number of comparisons that resulted in a match from the first, second, third and fourth comparisons, and terminate the voice call if the decoded slot type field indicates the end of the voice call and the number of comparisons that resulted in the match is at least two.

24. The device of claim 22 wherein the processor is further configured to perform a fifth comparison between a third portion of the first decoded frame and a third portion of the predetermined voice encoder frame, perform a sixth comparison between a third portion of the second decoded frame and the third portion of the predetermined voice encoder frame, and terminate the voice call if the decoded slot type field indicates the end of the voice call, the number of comparisons that resulted in a match from the first, second, third and fourth comparisons is at least two; and both the fifth and sixth comparisons resulted in a match.

* * * * *

UNITED STATES PATENT AND TRADEMARK OFFICE

CERTIFICATE OF CORRECTION

PATENT NO. : 7,564,830 B2
APPLICATION NO. : 11/467182
DATED : July 21, 2009
INVENTOR(S) : Desai et al.

It is certified that error appears in the above-identified patent and that said Letters Patent is hereby corrected as shown below:

IN THE SPECIFICATION

In Column 2, Line 28, delete “clazrity” and insert -- clarity --, therefor.

Signed and Sealed this
Eleventh Day of October, 2011

David J. Kappos
*Director of the United States Patent and Trademark Office*